US008713532B2

United States Patent
Gogh et al.

(10) Patent No.: US 8,713,532 B2
(45) Date of Patent: Apr. 29, 2014

(54) DEBUGGING USING CODE ANALYSIS

(75) Inventors: Jeffrey van Gogh, Redmond, WA (US); Michael C. Fanning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1800 days.

(21) Appl. No.: 11/655,679

(22) Filed: Jan. 19, 2007

(65) Prior Publication Data

US 2008/0178155 A1 Jul. 24, 2008

(51) Int. Cl.
*G06F 9/44* (2006.01)

(52) U.S. Cl.
USPC .......................... 717/125; 717/124; 717/127

(58) Field of Classification Search
None
See application file for complete search history.

(56) References Cited

U.S. PATENT DOCUMENTS

| 5,651,111 | A | 7/1997 | McKeeman et al. |
| 6,493,868 | B1 | 12/2002 | DaSilva et al. |
| 6,550,058 | B1 | 4/2003 | Wynn |
| 6,553,564 | B1 | 4/2003 | Alexander, III et al. |
| 6,587,995 | B1 | 7/2003 | Duboc et al. |
| 6,857,120 | B1 | 2/2005 | Arnold et al. |
| 6,901,581 | B1 | 5/2005 | Schneider |
| 6,925,638 | B1 | 8/2005 | Koved et al. |
| 7,089,542 | B2 | 8/2006 | Brand et al. |
| 2003/0056192 | A1 | 3/2003 | Burgess |
| 2003/0088854 | A1* | 5/2003 | Wygodny et al. ............. 717/130 |
| 2006/0225056 | A1 | 10/2006 | Mukkavilli |
| 2007/0143795 | A1* | 6/2007 | Tran ................................ 725/46 |

OTHER PUBLICATIONS

Agrawal, et al., "Debugging with Dynamic Slicing and Backtracking", Date: Jun. 1993, pp. 589-616, vol. 23, No. 6, http://www.argreenhouse.com/papers/hira/spe93.pdf.
Bush, et al., "A static analyzer for finding dynamic programming errors", Date: 2000, pp. 775-802, http://www3.interscience.wiley.com/cgi-bin/abstract/72001834/ABSTRACT?CRETRY=1&SRETRY=0.
McMaster, et al., "Call Stack Coverage for Test Suite Reduction", http://www.cs.umd.edu/~atif/papers/McMasterMemonICSM2005.pdf#search='Call%20%Stack%20Coverage%20for%20Test%20Suite%20Reduction'.

* cited by examiner

*Primary Examiner* — Lewis A Bullock, Jr.
*Assistant Examiner* — Mark Gooray
(74) *Attorney, Agent, or Firm* — Kevin Sullivan; Kate Drakos; Micky Minhas

(57) ABSTRACT

Various technologies and techniques are disclosed for providing a code analysis debugger. A code analysis process is performed to identify possible program defects that are present in particular source code. The results of the code analysis are stored in a results file in a structured format. The structured format contains sections that describe details about the one or more portions of source code that have been identified as possibly having the program defects. The analysis results are retrieved for display. A debugger-like feature allows a user to review a representation of the program defects identified during the code analysis. The debugger-like feature has a graphical user interface that can display at least some of the possible program defects in a call stack for further review.

20 Claims, 8 Drawing Sheets

...
302 → <Issue Certainty="95" Level="CriticalError">
304 → <Text>Please review this stack for potential issues related to ......</Text>
306 → <CallStack>
308 → <Method Name="Demo(System.Int32, System.Double)" Line="1">
   <Branch Line="3"><Infer Variable="input" Value="<5">
     <MethodCall Name="Demo2(System.Int32, System.Double)" Line="5">
       <Branch Line="11"><Infer Variable="details" Value="<7">
         <MethodCall
           Name="Demo3(System.Int32, System.Double)"
           Line="5">
           <MethodCall
             Name="DoSomethingDangerous..."
             Line="5" />
         </MethodCall>
       </Branch>
     </MethodCall>
   </Branch>
</CallStack>
</Issue>

FIG. 5

DEBUGGING USING CODE ANALYSIS

BACKGROUND

Code analysis programs are designed to analyze the source code of a program and to identify possible program defects that are contained in the code. Many code analysis programs perform this analysis without actually executing the code. The results of code analysis programs are often stored and displayed to users in an unstructured string format, such as the example shown below:

"The following stack leads to a call to DoSomethingDangerous(input, details) where input is smaller than 5 and details is smaller than 7:
Demo(input, details): line 5
    Demo2(input, details): line 13
        Demo3(input, details): line 18
Please review this stack for potential issues related to < . . . >"

In the above example, the format is unstructured because it is not easy to identify the particular pieces of information that are contained within the message. A user who is provided with such analysis information must interpret the information and manually review the source code associated with the information mentioned in the message. This often involves trying to track down the path that led to the particular call being displayed in the message. This manual process of analyzing the results and tracking down the sources can be very tedious.

SUMMARY

Various technologies and techniques are disclosed for providing a code analysis debugger. A code analysis process is performed to identify possible program defects that are present in particular source code. The results of the code analysis are stored in a results file in a structured format. The structured format contains sections that describe details about the one or more portions of source code that have been identified as possibly having the program defects. In one implementation, the structured format is an extensible markup language (XML) format.

The analysis results are retrieved for display. A debugger-like feature allows a user to review a representation of the program defects identified during the code analysis. The debugger-like feature has a graphical user interface that can display at least some of the possible program defects in a call stack for further review. In one implementation, the user can select a particular entry in the call stack and view a source code file associated with that entry to perform further analysis.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an example of an XML structured file that contains results from a code analysis process that identify possible program defects.

DETAILED DESCRIPTION

Figure 1:
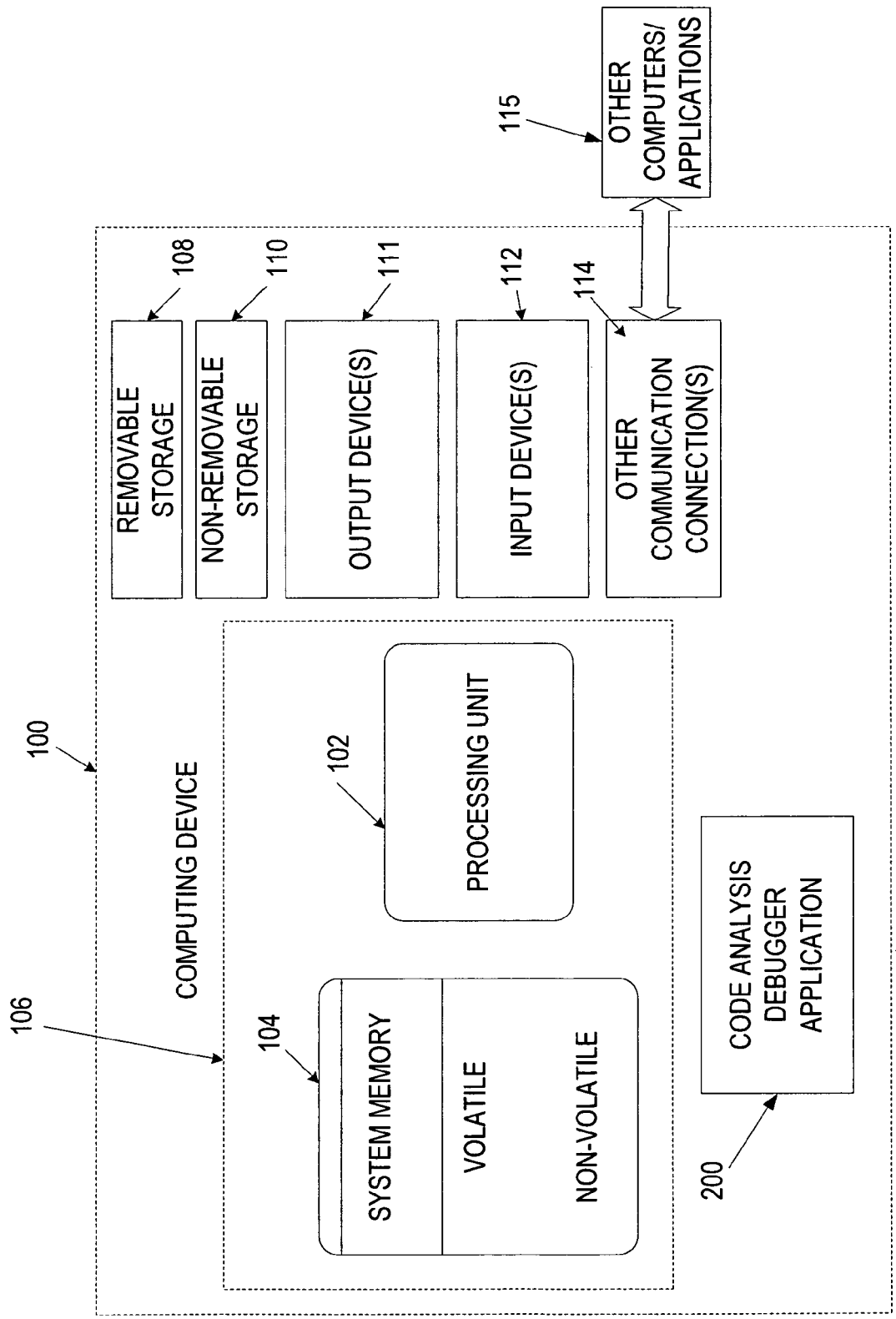
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides code analysis and/or review capabilities, but the system also serves other purposes in addition to these. In one implementation, one or more of the techniques described herein can be implemented as features within a software development program such as MICROSOFT® VISUAL STUDIO®, or from any other type of program or service that identifies and/or displays potential program defects from a code analysis process.

In one implementation, the user is provided with a debugger-like step-through experience for reviewing code analysis results. The code analysis process stores call stack details, path through code, variable data values, etc., along with any potential program defects that go with these details. The user can use a debugger-like user interface to interact with the analysis results, such as viewing a call stack and then selecting an item from the call stack to view the source code related with the selected call stack item. The user is able to step through the code that leads to the potential program defect in a manner that is similar to a traditional software debugging experience.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes code analysis debugger application 200. Code analysis debugger application 200 will be described in further detail in FIG. 2.

Figure 2:
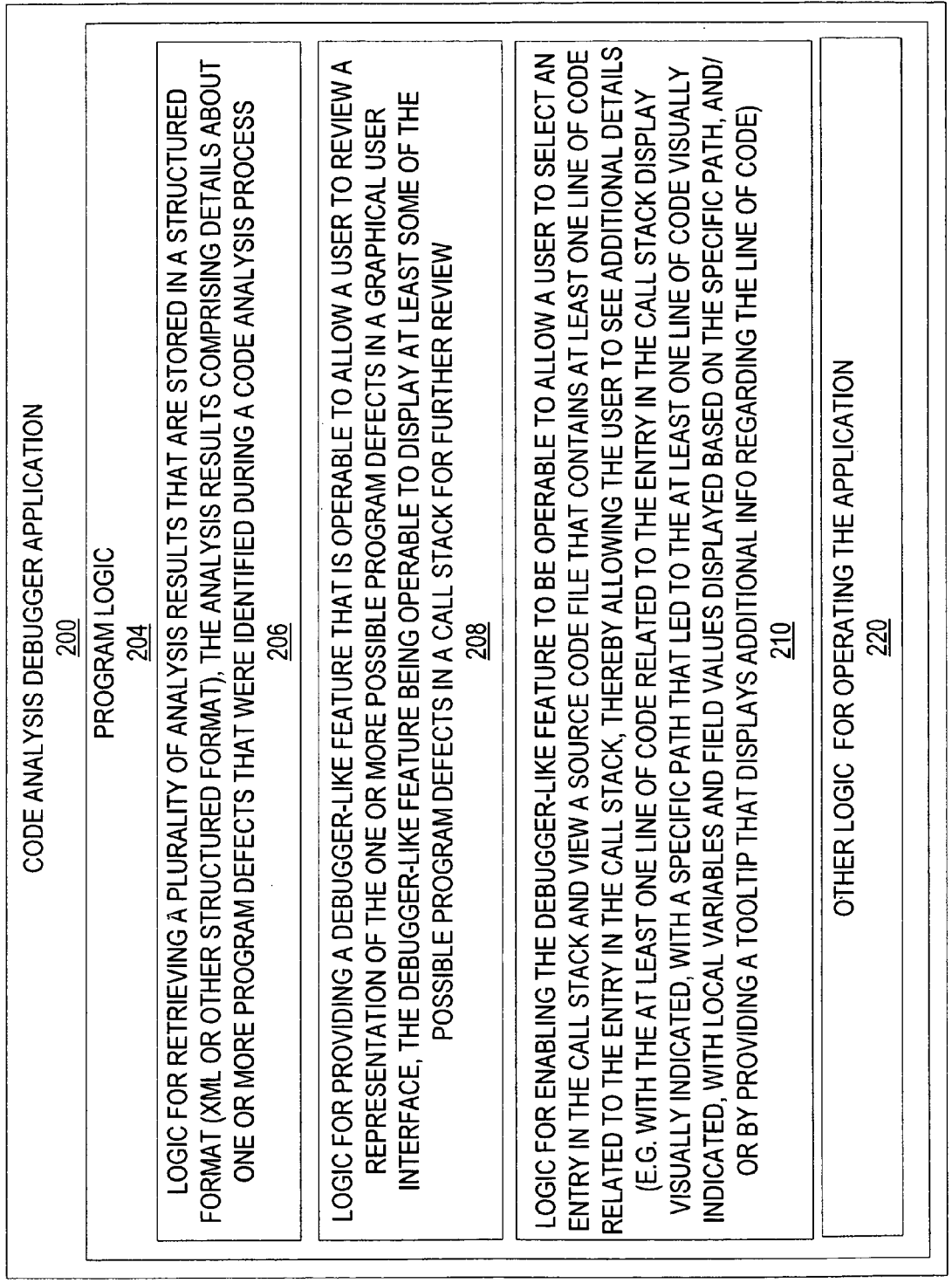
FIG. 2 is a diagrammatic view of a code analysis debugger application of one implementation operating on the computer system of FIG. 1.

Turning now to FIG. 2 with continued reference to FIG. 1, a code analysis debugger application 200 operating on computing device 100 is illustrated. Code analysis debugger application 200 is one of the application programs that reside on computing device 100. However, it will be understood that code analysis debugger application 200 can alternatively or additionally be embodied as computer-executable instructions on one or more computers and/or in different variations than shown on FIG. 1. Alternatively or additionally, one or more parts of code analysis debugger application 200 can be part of system memory 104, on other computers and/or applications 115, or other such variations as would occur to one in the computer software art.

Code analysis debugger application 200 includes program logic 204, which is responsible for carrying out some or all of the techniques described herein. Program logic 204 includes logic for retrieving a plurality of analysis results that are stored in a structured format (XML or other structured format), the analysis results comprising details about one or more program defects that were identified during a code analysis process 206; logic for providing a debugger-like feature that is operable to allow a user to review a representation of the one or more possible program defects in a graphical user interface, the debugger-like feature being operable to display at least some of the possible program defects in a call stack for further review 208; logic for enabling the debugger-like feature to be operable to allow a user to select an entry in the call stack and view a source code file that contains at least one line of code related to the entry in the call stack, thereby allowing the user to see additional details (e.g. with the at least one line of code related to the entry in the call stack display visually indicated, with a specific path that led to the at least one line of code visually indicated, with local variables and field values displayed based on the specific path, and/or by providing a tooltip that displays additional info regarding the line of code) 210; and other logic for operating the application 220. In one implementation, program logic 204 is operable to be called programmatically from another program, such as using a single call to a procedure in program logic 204.

Figure 3:
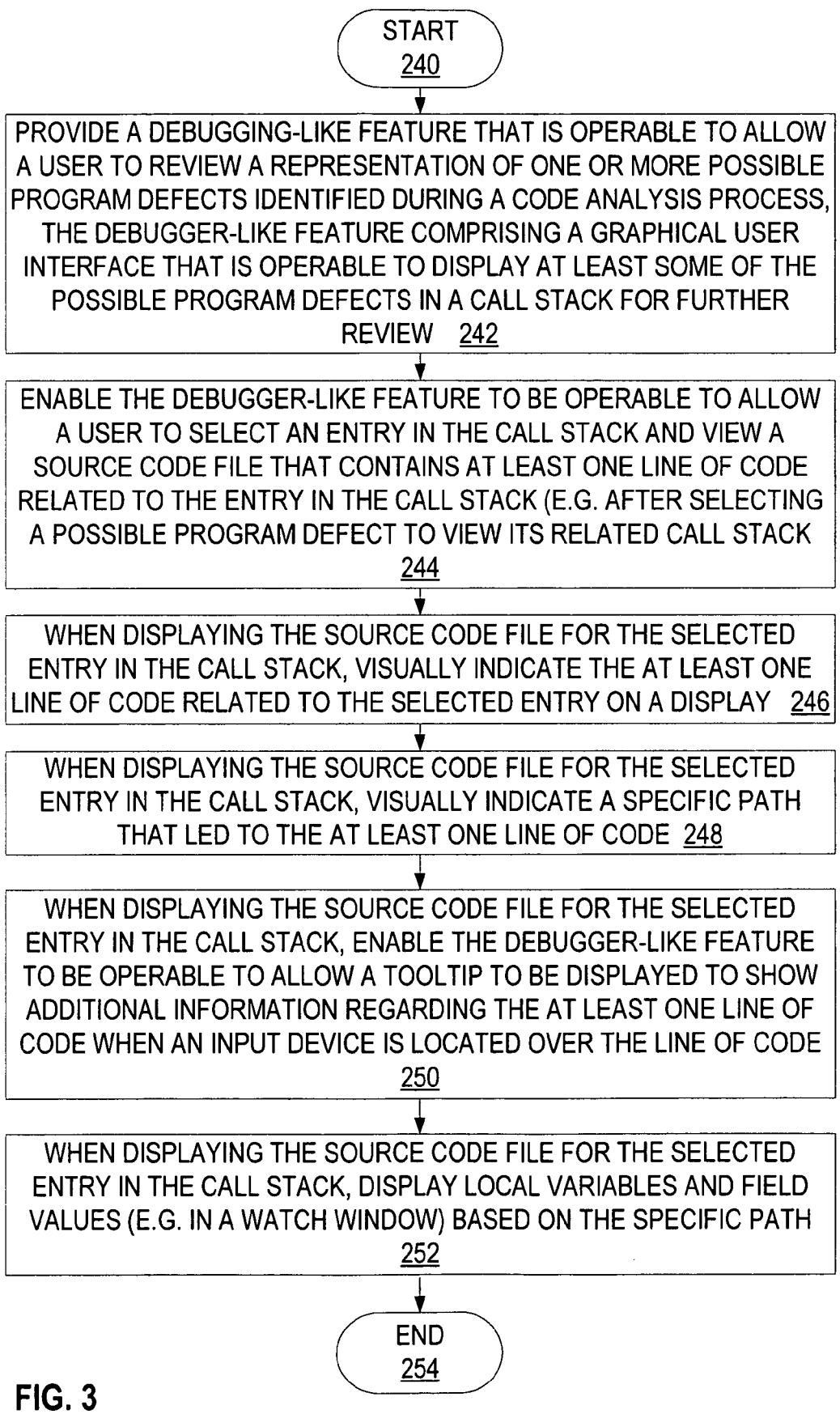
FIG. 3 is a high-level process flow diagram for one implementation of the system of FIG. 1.
Figure 4:
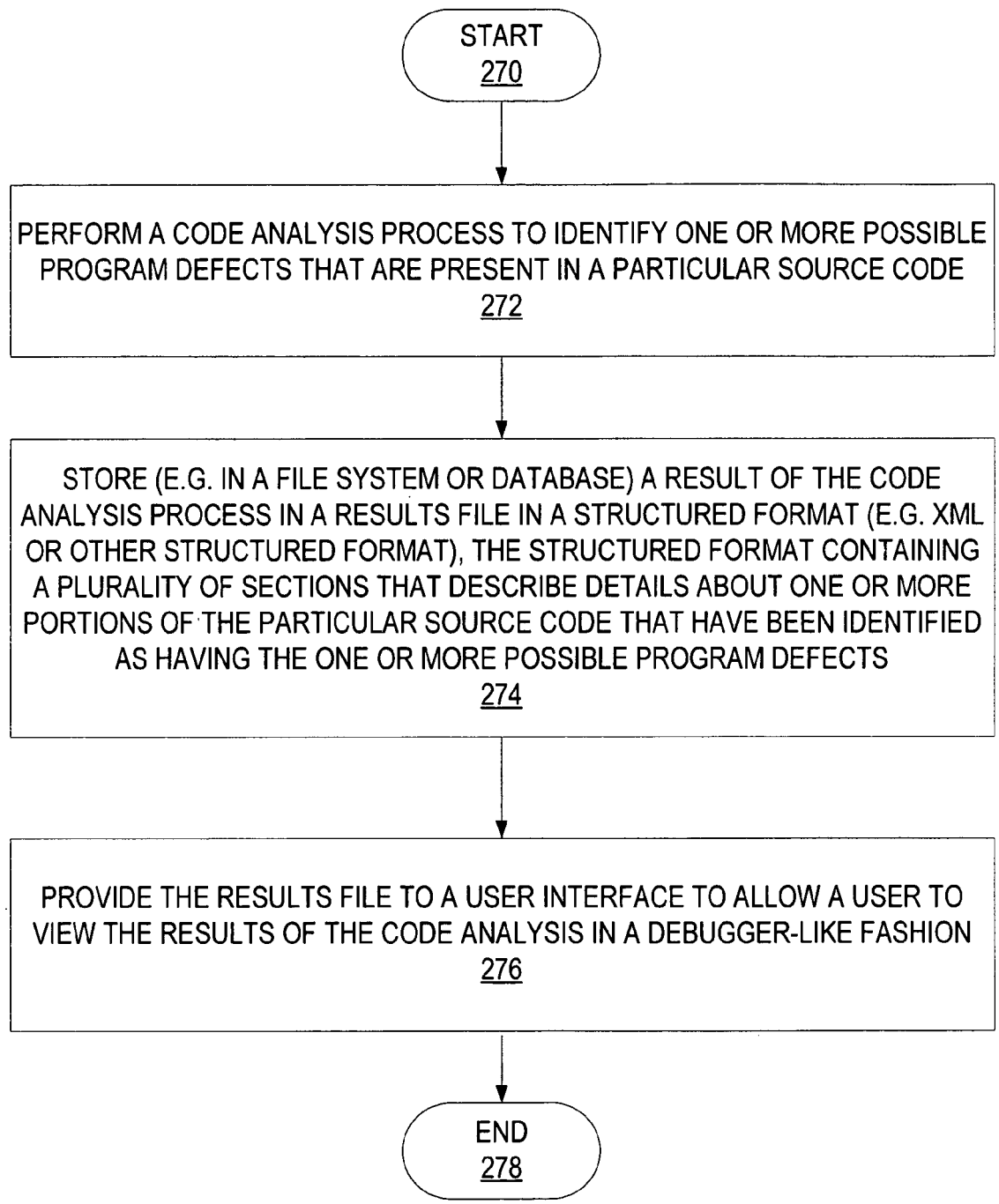
FIG. 4 is a process flow diagram for one implementation of the system of FIG. 1 illustrating the stages involved in storing code analysis results in a structured format for use in a code analysis debugger.

Turning now to FIGS. 3-4 with continued reference to FIGS. 1-2, the stages for implementing one or more implementations of code analysis debugger application 200 are described in further detail. FIG. 3 is a high level process flow diagram for code analysis debugger application 200. In one form, the process of FIG. 3 is at least partially implemented in the operating logic of computing device 100. The procedure begins at start point 240 with providing a debugging-like feature that is operable to allow a user to review a representation of one or more possible program defects identified during a code analysis process, the debugger-like feature comprising a graphical user interface that is operable to display at least some of the possible program defects in a call stack for further review (stage 242). The debugger-like feature is operable to allow a user to select an entry in the call stack and view a source code file that contains at least one line of code related to the entry in the call (e.g. after selecting a possible program defect in a list to view its related call stack) (stage 244). When displaying the source code file for the selected entry in the call stack, the system visually indicates the at least one line of code related to the selected entry on a display (stage 246). When displaying the source code file for the selected entry in the call stack, the system visually indicates a specific path that led to the at least one line of code (stage 248). When displaying the source code file for the selected entry in the call stack, the debugger-like feature is operable to allow a tooltip to be displayed to show additional information regarding the at least one line of code when an input device is located over the line of code (stage 250). When displaying the source code file for the selected entry in the call stack, local variables and field values (e.g. in a watch window) can be displayed based on the specific path (stage 252). In other implementations, the debugger-like feature may only have some, all, or additional features for performing code analysis than these described herein. The process ends at end point 254.

FIG. 4 illustrates one implementation of the stages involved in storing code analysis results in a structured format for use in a code analysis debugger. In one form, the process of FIG. 4 is at least partially implemented in the operating logic of computing device 100. The procedure begins at start point 270 with performing a code analysis process to identify one or more possible program defects that are present in a particular source code (stage 272). A result of the code analysis process is stored (e.g. in a file system or database) in a results file in a structured format (e.g. XML or other structured format) (stage 274). The structured format contains a plurality of sections that describe details about one or more portions of the particular source code that have been identified as having the one or more possible program defects (stage 274). An example of a results file 300 stored in a structured format is shown in FIG. 5. The example shown in FIG. 5 is in an XML structured format, and contains different sections that describe the data elements contained in the code analysis results, such as the issue 302, text associated with the issue 304, as well as the call stack details 306, such as the method details 308. Structured formats other than XML could also be used in alternate implementations. Returning now to FIG. 4, the results file is provided to a user interface to allow a user to view the results of the code analysis in a debugger-like fashion (stage 276). The process ends at end point 278.

Figure 6:
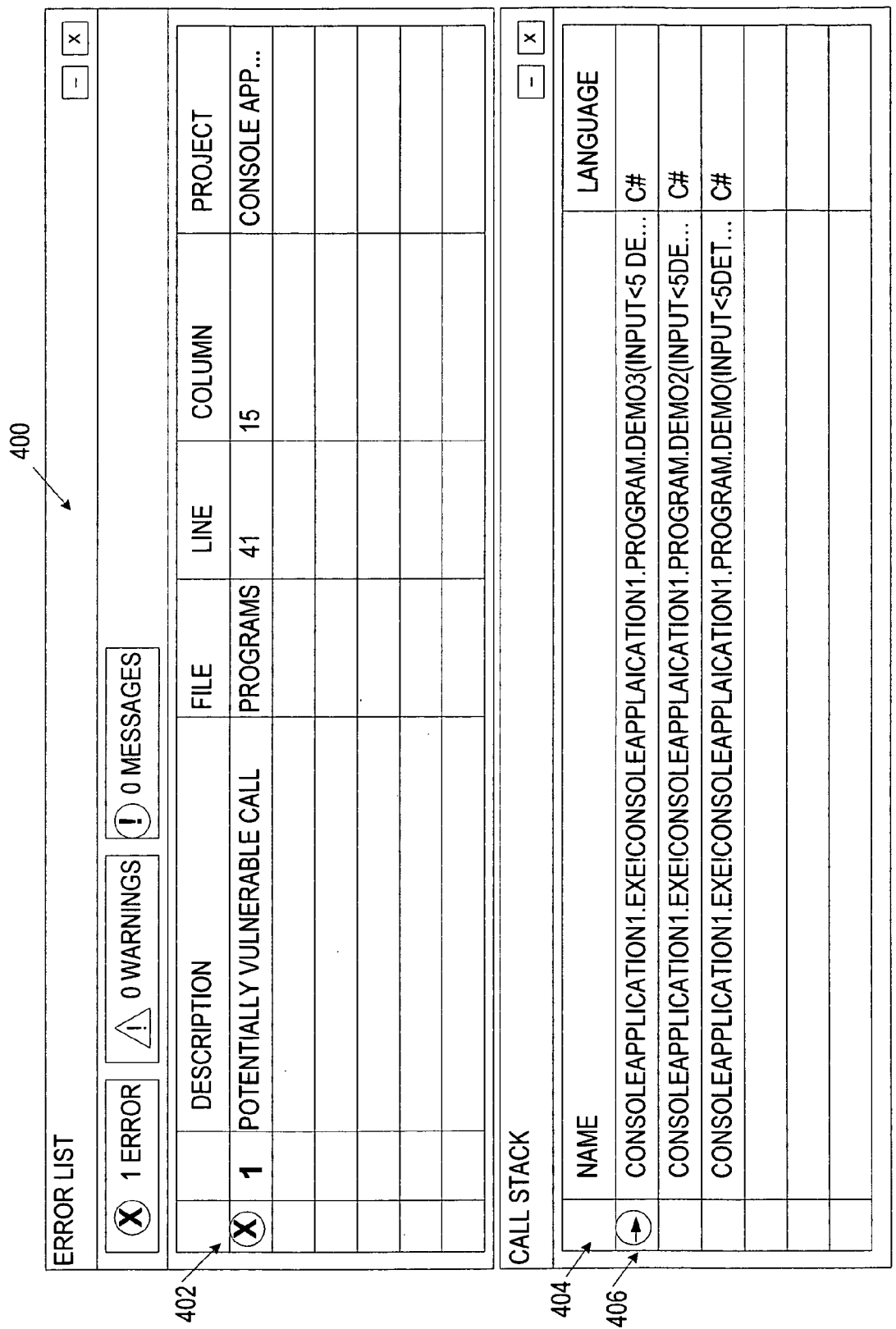
FIG. 6 is a simulated screen for one implementation of the system of FIG. 1 that illustrates displaying the results of a code analysis process in a call stack.
Figure 7:
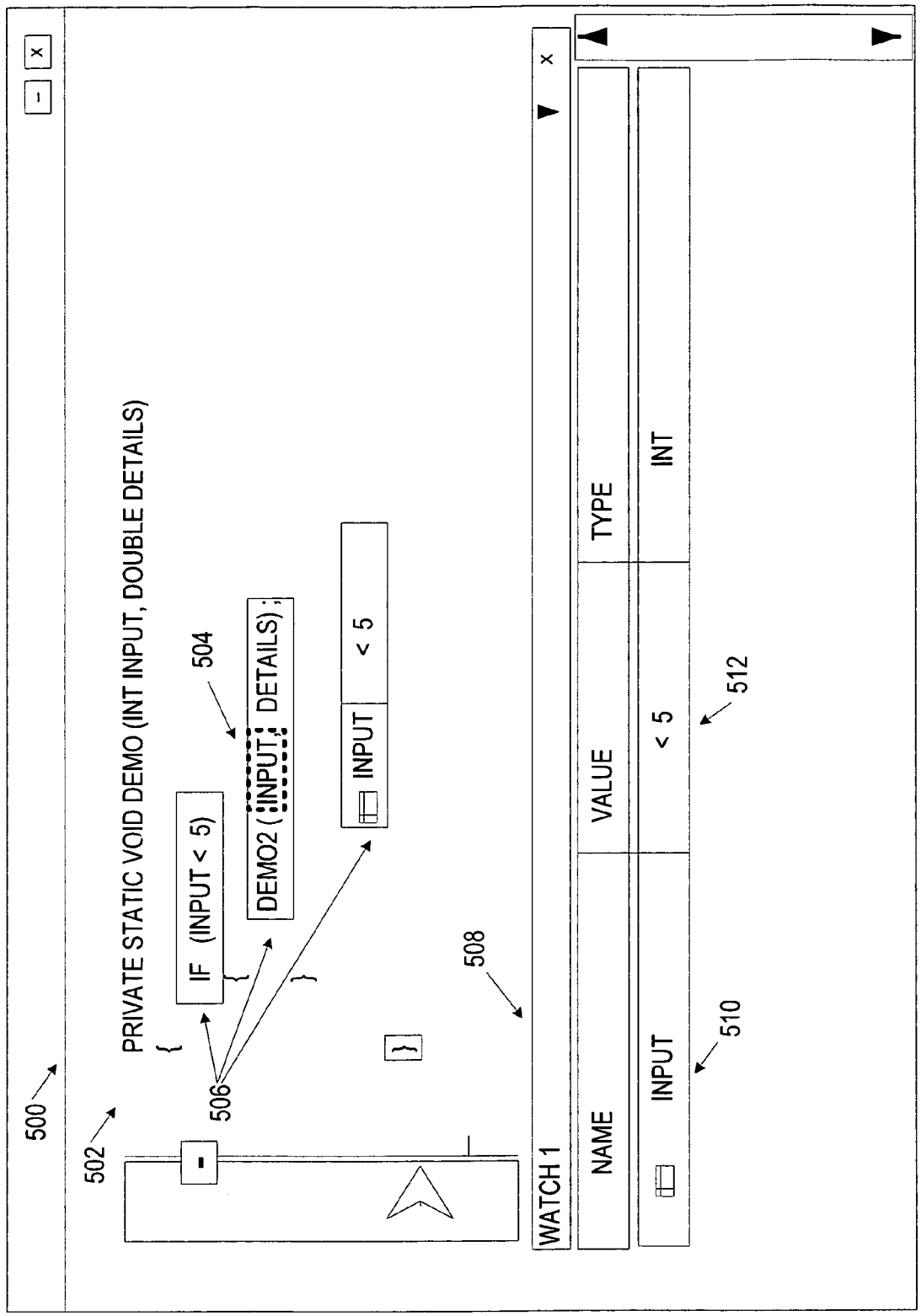
FIG. 7 is a simulated screen for one implementation of the system of FIG. 1 that illustrates displaying a source code file associated with a particular selected entry in the call stack.
Figure 8:
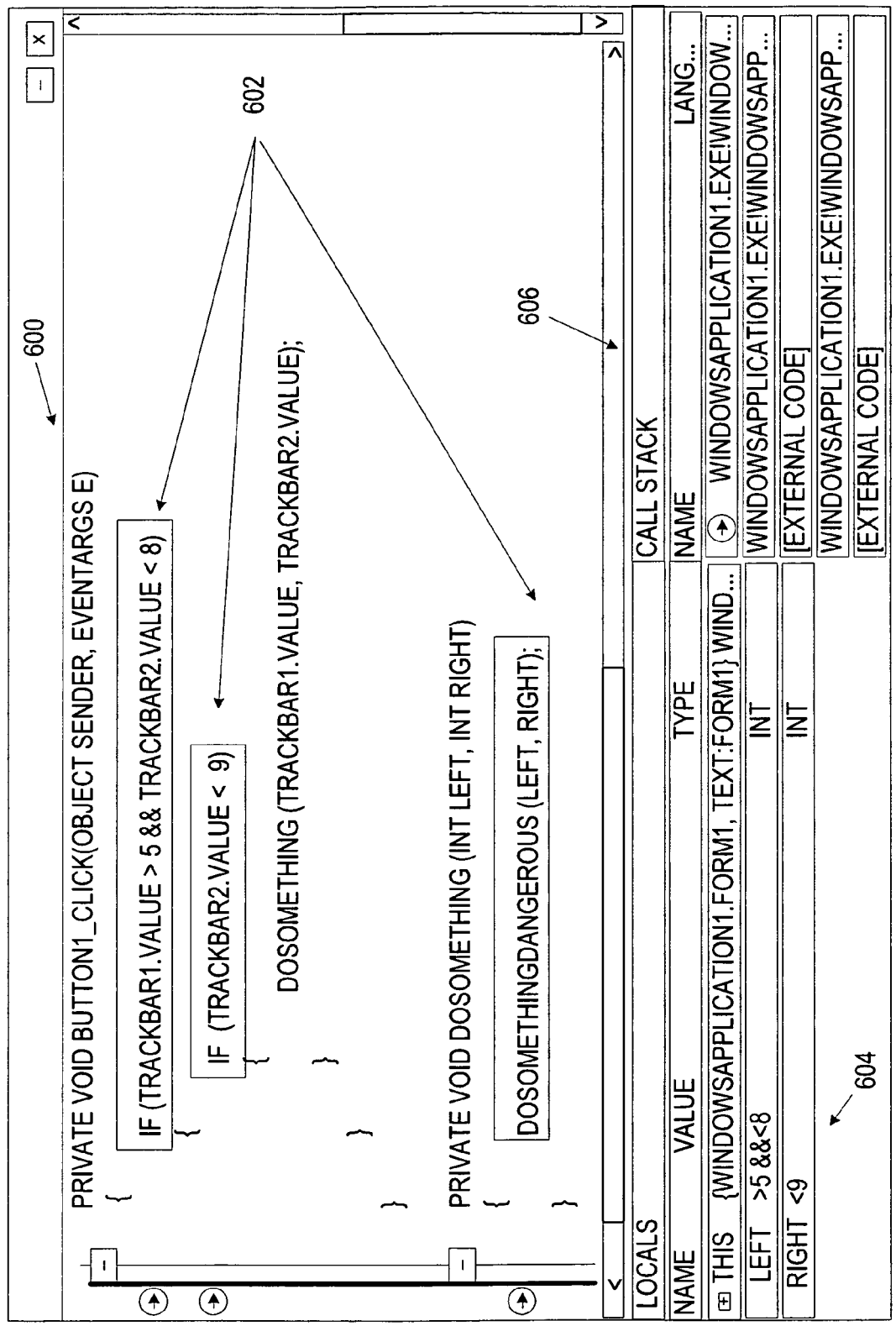
FIG. 8 is a simulated screen for one implementation of the system of FIG. 1 that illustrates displaying a source code file associated with a particular selected entry in the call stack with various additional details indicated.

Turning now to FIGS. 6-8, simulated screens are shown to illustrate a user interface that provides a debugger-like user interface using code analysis debugger application 200 for reviewing the results of a code analysis process. These screens can be displayed to users on output device(s) 111. Furthermore, these screens can receive input from users from input device(s) 112.

FIG. 6 is a simulated screen 400 for one implementation of the system of FIG. 1 that illustrates displaying the results of a code analysis process in a call stack 404. Various issues that were identified as potential program defects in the source code during code analysis are displayed in the list of potential program defects 402. If the user selects a potential problem from the list 402, then the call stack 404 for the selected potential problem is displayed. The user can then select (such as by double-clicking or otherwise selecting) a particular entry 406 in the call stack 404 to view a code window similar to FIG. 7. Simulated screen 500 of FIG. 7 shows the source code file 502 associated with the particular selected entry in the call stack. In one implementation, the particular one or more lines of code that have the possible program defect 504 is visually indicated, such as by a highlight. Alternatively or additionally, a path 506 that led to the line of code that was taken by the program is visually indicated, such as by a highlight. A watch window 508 indicates the values of local variables and/or fields. In the example shown, the value is indicated for the "input" variable 510 is less than five 512. Since the program was not actually executed during code analysis, there may not be a specific actual value for variables in all situations, and instead, there will be ranges of values that are identified when noting potential program defects.

Turning now to FIG. 8, simulated screen 600 for one implementation is shown that illustrates a source code file associated with a particular selected entry in the call stack with various additional details indicated. A more complex path 602 is shown to illustrate how the potential program defect is related to multiple methods or functions. A locals window 604 and a call stack 606 are also shown to display additional details related to the potential program defect. In one implementation, locals window 604 and call stack 606 can show complicated statements about variable values such as ranges, etc. This is shown in a way that developers can easily understand, such as a binary expression.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A system comprising:
   at least one processor and a memory, the memory including a code debugger application, the code debugger application having instructions that when executed on a processor perform the actions comprising:
   performing a code analysis process on source code without executing the source code;
   identifying during the code analysis process at least one possible program defect;
   displaying a review of a representation of the at least one possible program defects identified during the code analysis process;
   selecting one of the at least one possible program defect;
   displaying a call stack associated with the selected one of the at least one possible program defect
   displaying at least one selectable entry in the call stack; and
   in response to selection of the at least one selectable entry, displaying a portion of the source code corresponding to the at least one possible program defect including a variable and a range of one or more possible values for the variable.

2. The system of claim 1, wherein the code debugger application further performs the actions comprising:
   displaying a source code file that is associated with the selectable entry in the call stack.

3. The system of claim 1, wherein the code debugger application further performs the action comprising:
   visually indicating at least one line of source code related to the selectable entry in the call stack.

4. The system of claim 1, wherein the code debugger application further performs the action comprising:
   utilizing a tooltip that displays additional information regarding at least one line of source code related to the selectable entry when an input device is located over at least one line of source code.

5. The system of claim 1, wherein the code debugger application further performs the action comprising:
   visually indicating a specific path that led to at least one line of source code related to the selectable entry in the call stack.

6. The system of claim 5, wherein the code debugger application further performs the action comprising:
   displaying local variables and field values based on the specific path.

7. The system of claim 6, wherein the code debugger application further performs the action comprising:
   displaying the local variables and field values in a watch window.

8. The system of claim 1, wherein the code analysis process is performed within a software development program.

9. A method comprising:
   performing a code analysis process to identify one or more possible program defects that are present in source code of a program, the code analysis process being performed without executing the program;
   displaying, on a display device, at least one of the one or more possible program defects;
   receiving a selection of the at least one of the one or more possible program defects;
   in response to receiving the selection, displaying at least one selectable entry in a call stack, the at least one selectable entry corresponding to the at least one of the one or more possible program defects identified by the code analysis process; and
   in response to selection of the at least one selectable entry, displaying, in a window, at least a portion of a source code file corresponding to the at least one of the one or more possible program defects, the at least portion of the source code file including a variable, and displaying a range of values for the variable, the range including a plurality of possible values for the variable.

10. The method of claim 9, further comprising storing results of the code analysis process in a structured format at least partly in an Extensible Markup Language (XML) format.

11. The method of claim 9, further comprising storing a results file resulting from the code analysis process.

12. The method of claim 9, further comprising storing a results file resulting from the code analysis process in a database.

13. The method of claim 9, wherein the code analysis process is part of a software development program.

14. A computer-readable storage medium not consisting of a signal, storing computer-executable instructions for causing at least one computing device to perform operations comprising:
- performing a code analysis process on a program without execution of the program;
- retrieving a plurality of analysis results that are stored in a structured format, the analysis results comprising details about one or more program defects that were identified during the code analysis process;
- providing a review of a representation of the one or more possible program defects in a graphical interface;
- displaying a call stack associated with a selected one of the one or more possible program defects;
- selecting at least one entry of the call stack; and
- displaying the at least one selectable entry in the call stack with source code of the program corresponding to the selected one of the one or more possible program defects, the source code including a variable and a range of values for the variable.

15. The computer-readable storage medium of claim 14, wherein the code analysis process is part of a software development program.

16. The computer-readable storage medium of claim 14, the operations further comprising visually indicating at least one line of source code related to the entry in the call stack on a display.

17. The computer-readable storage medium of claim 14, the operations further comprising visually indicating a specific path that led to at least one line of source code related to the entry in the call stack.

18. The computer-readable storage medium of claim 17, the operations further comprising displaying local variables and field values based on the specific path.

19. The computer-readable storage medium of claim 14, the operations further comprising providing a tooltip that displays additional information regarding at least one line of source code when an input device is located over the line of source code.

20. The computer-readable storage medium of claim 14, the operations further comprising storing the source code in a structured format at least partly in an Extensible Markup Language (XML) format.

* * * * *